United States Patent
Nakamura et al.

[11] Patent Number: 4,830,640
[45] Date of Patent: May 16, 1989

[54] AROMATIC IMIDE POLYMER HOLLOW FILAMENTS

[75] Inventors: Asumaru Nakamura; Yoshihiro Kusuki; Takashi Harada, all of Ichihara, Japan

[73] Assignee: Agency of Industrial Science and Technology, Tokyo, Japan

[21] Appl. No.: 21,654

[22] Filed: Mar. 4, 1987

Related U.S. Application Data

[62] Division of Ser. No. 745,144, Jun. 14, 1985.

[30] Foreign Application Priority Data

Jun. 20, 1984 [JP] Japan ................ 59-125340

[51] Int. Cl.⁴ ............................ B01D 53/22
[52] U.S. Cl. ........................ 55/158; 55/16; 55/68
[58] Field of Search ............ 55/16, 68, 158; 210/500.39; 264/41, 561

[56] References Cited

U.S. PATENT DOCUMENTS

| | | | |
|---|---|---|---|
| 4,378,324 | 3/1983 | Makino et al. | 210/500.39 X |
| 4,378,400 | 3/1983 | Makino et al. | 55/158 X |
| 4,385,084 | 5/1983 | Iwama et al. | 264/41 X |
| 4,440,643 | 4/1984 | Makino et al. | 55/158 X |
| 4,460,526 | 7/1984 | Makino et al. | 264/561 X |
| 4,474,662 | 10/1984 | Makino et al. | 264/41 X |
| 4,474,858 | 10/1984 | Makino et al. | 55/158 X |
| 4,485,056 | 11/1984 | Makino et al. | 264/41 |
| 4,512,893 | 4/1985 | Makino et al. | 55/158 X |
| 4,528,004 | 7/1985 | Makino et al. | 55/158 |

FOREIGN PATENT DOCUMENTS

| | | | |
|---|---|---|---|
| 5344 | 1/1983 | Japan | 55/158 |
| 8512 | 1/1983 | Japan | 55/158 |
| 22902 | 2/1985 | Japan | 55/158 |
| 82103 | 5/1985 | Japan | 55/158 |
| 150806 | 8/1985 | Japan | 210/500.39 |

Primary Examiner—Robert Spitzer
Attorney, Agent, or Firm—Burgess, Ryan and Wayne

[57] ABSTRACT

An aromatic imide polymer hollow filament having an excellent gas separating property is produced by a process comprising the steps of:

(1) dissolving an aromatic imide copolymer comprising (A) 20 to 85 molar % of recurring units of the formula (I):

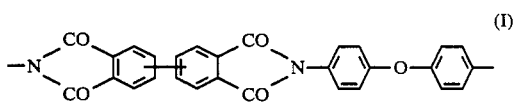

(B) 10 to 35 molar % of recurring units of the formula (II):

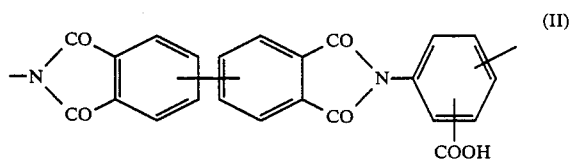

and (C) 5 to 55 molar % of recurring units of the formula (III):

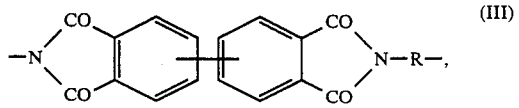

wherein R represents a divalent radical of the formula (IV) or (V):

and (Abstract continued on next page.)

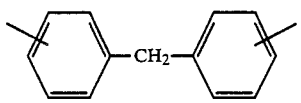 (V)

wherein $R^1$ and $R^2$ respectively represent, a hydrogen atom, alkoxyl radical having 1 to 3 carbon atoms or alkyl radical having 1 to 3 carbon atoms, in a solvent consisting essentially of at least one phenolic compound to provide a spinning dope solution;

(2) extruding the dope solution through a spinneret having at least one hollow filament spinning orifice, to provide at least one hollow filamentary stream of the dope solution, and (3) introducing the dope solution hollow stream into a coagulating bath comprising at least one polar solvent which is compatible with the phenolic compound but not capable of dissolving the aromatic imide copolymer, to solidify the hollow stream into a hollow filament.

5 Claims, 2 Drawing Sheets

AROMATIC IMIDE POLYMER HOLLOW FILAMENTS

This is a division of application Ser. No. 745,144, filed June 14, 1985.

BACKGROUND OF THE INVENTION (1) Field of the Invention

The present invention relates to a process for producing aromatic imide polymer hollow filaments. More particularly, the present invention relates to a process for producing aromatic imide polymer hollow filaments useful for separating two or more different gases, for example, hydrogen gas and carbon monoxide gas, from each other with an excellent efficiency or for concentrating the gases from a dope solution of a specific aromatic imide polymer dissolved in a specific phenolic solvent by a wet membrane-forming method.

(2) Description of the Related Art

Various methods for producing aromatic imide polymer semipermeable membranes or hollow filaments from a dope solution of an aromatic imide polymer in a phenolic solvent are disclosed by, for example, U.S. Pat. Nos. 4,378,400 for H. Makino et al and 4,378,324 for H. Makino et al.

However, the products of the methods disclosed by the above-mentioned publications are still not satisfactory in the gas-separating properties thereof. That is, the aromatic imide polymer membranes disclosed in the above-mentioned publications are used as a separating membrance for a hydrogen-carbon monoxide mixture gas. The membrance exhibits an unsatisfactory selective gas permeability ($P_{H2}/P_{CO}$) of about 20 to 65 and an unsatisfactory hydrogen gas permeating rate ($P_{H2}$) of about $1.5 \times 10^{-5}$ cm$^3$/cm$^2$sec.cmHg or less.

The term "gas permeating rate" used herein is defined as follows.

Gas permeating rate
$(cm^3/cm^2.sec.cmHg) \times X/(A \times T \times D)$ wherein X represents an amount (volume) in cm$^3$ of the gas passed through a membrane. A represents a surface area in cm$^2$ of the membrane through which the gas passed T represents a transmission time in sec. of the gas through the membrane and D represents a difference in pressure in cmHg between the gas-supply side and the opposite side of the membrane.

Accordingly, it is strongly desirable to provide a process for producing aromatic imide polymer hollow filaments which are useful as gas-separating hollow filaments having an excellent gas selective permeability and a superior hydrogen gas permeating rate ($P_{H2}$).

SUMMARY OF THE INVENTION

An object of the present invention is to provide a process for producing aromatic imide polymer hollow filaments having an excellent gas separating property in addition to excellent heat resistance, chemical resistance, and mechanical strength.

Another object of the present invention is to provide a process for producing aromatic imide polymer hollow filaments which exhibit an excellent gas selective permeability, for example, a ratio ($P_{H2}/P_{CO}$) of hydrogen gas permeating rate ($P_{H2}$) to carbon monoxide gas permeating rate ($P_{CO}$) of about 40 or more, preferably about 50 to 100, and an excellent hydrogen gas permeating rate ($P_{H2}$) of about $3 \times 10^{-5}$ cm$^3$/cm$^2$.sec.cmHg or more. The above-mentioned objects can be attained by the process of the present invention, which comprises the steps of: (1) dissolving an aromatic imide copolymer comprising (A) 20 to 85 molar % of recurring units of the formula (I):

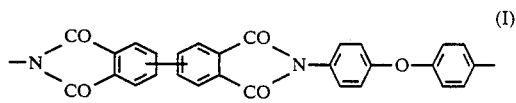

(B) 10 to 35 molar % of recurring units of the formula (II):

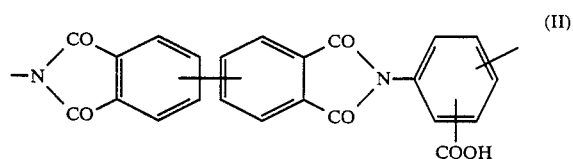

and (C) 5 to 55 molar % recurring units of the formula (III):

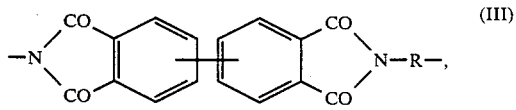

wherein R represents a divalent radical selected from those of the formulae (IV) and (V):

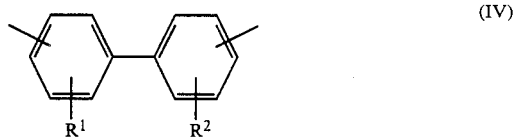

and

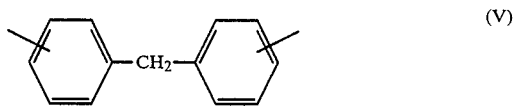

wherein $R^1$ and $R^2$ respectively represent, independently from each other, a member selected from the group consisting of hydrogen atoms, alkoxyl radicals having 1 to 3 carbon atoms and alkyl radicals having 1 to 3 carbon atoms, in a solvent consisting essentially of at least one phenolic compound to provide a spinning dope solution; (2) extruding the dope solution through a spinneret having at least one hollow filament spinning orifice into the ambient atmosphere, to provide at least one hollow filamentary stream of the dope solution, and (3) introducing the dope solution hollow filamentary stream into a coagulating bath comprising at least one polar solvent, which is compatible with the phenolic compound but substantially not capable of dissolving the aromatic imide copolymer to solidify the hollow filamentary stream into a hollow filament.

In the process of the present invention, it is important that the dope solution be prepared by dissolving a specific aromatic imide copolymer as defined above in a specific phenolic solvent The use of the dope solution causes the resultant hollow filament to exhibit an excellent hydrogen gas permeating rate ($P_{H2}$) of $3 \times 10^{-5}$ cm$^3$/cm$^2$sec.cmHg or more.

Where the aromatic imide copolymer contains recurring units (C) of the formula (III) in which R represents a divalent diphenylmethane radical of the formula (V), the resultant hollow filament exhibits an excellent resistance to compression and a superior mechanical strength in addition to the excellent gas separating property.

DESCRIPTION OF THE PREFERRED EMBODIMENTS

Figure 1:
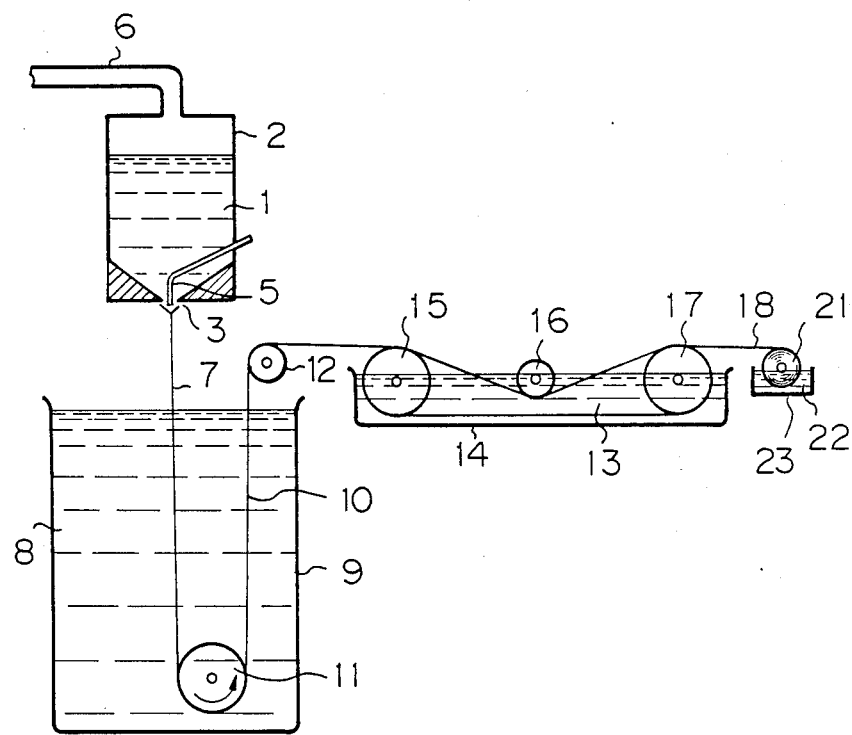
FIG. 1 is an explanatory cross-sectional side view of an apparatus for producing undrawn aromatic imide polymer hollow filaments in accordance with the process of the present invention.

The term "aromatic imide polymer" used in the present invention refers to a polymer produced by the condensation polymerization of at least one aromatic tetracarboxylic acid monomer with at least one aromatic diamine monomer.

In the first step of the process of the present invention, a spinning dope solution is prepared by dissolving a specific aromatic imide copolymer in a solvent consisting essentially of at least one phenolic compound.

The specific aromatic imide copolymer comprises (A) 20 to 85 molar %, preferably 25 to 80 molar %, of recurring units of the formula (I):

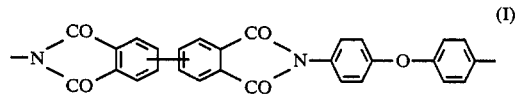

(B) 0 to 35 molar %, preferably 15 to 30 molar %, of recurring units of the formula (II);

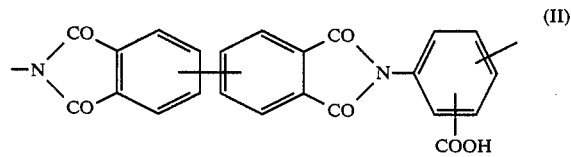

and (C) 5 to 55 molar %, preferably 10 to 50 molar %, of recurring units of the formula (III):

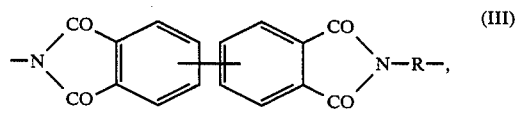

wherein R represents a divalent aromatic radical selected from those of the formulae (IV) and (V):

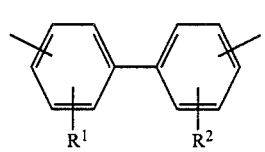

and

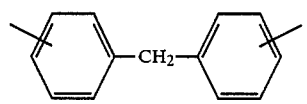

wherein $R^1$ and $R^2$ respectively represent, independently from each other, a member selected from the group consisting of hydrogen alkoxyl radicals having 1 to 3 carbon atoms and alkyl radicals having 1 to 3 carbon atoms.

The divalent radical represented by R in the formula (III) is preferably of the formula (V).

In the aromatic imide copolymer, if the content of the recurring units (A) is more than 85 molar %, and the contents of the recurring units (B) and (C) are less than 10 molar % and 5 molar %, respectively, the resultant aromatic imide polymer hollow filament will exhibit an unsatisfactory hydrogen gas permeating rate.

If the content of the recurring units (B) is more than 35 molar % or tee content of the recurring units (C) is more than 55 molar %, the resultant aromatic imide copolymer will exhibit a poor solubility in the phenolic solvent. Therefore, the resultant spinning dope solution will exhibit a poor evenness and an undesirably decreased stability for storage. Therefore, the hollow filament spinning procedures will be uneven and unstable.

The aromatic imide copolymer usable for the present invention preferably has a logarithmic viscosity of from about 0.3 to 7.0, more preferably from 0.4 to 5.0, still more preferably, from 0.5 to 4.0, determined at a concentration of 0.5 g per 100 ml of a solvent consisting of a mixture of 4 parts by volume of p-chlorophenol with 1 part by volume of o-chlorophenol at a temperature of 30° C.

The aromatic imide copolymer can be prepared by any condensation polymerization-imidization processes.

The recurring units (A) of the formula (I) can be derived from the condensation polymerization-imidization procedures of at least one biphenyl tetracarboxylic acid or its functional derivative, for example, anhydride or acid chloride thereof, with 4,4'-diaminodiphenylether.

The recurring units (B) of the formula (II) can be derived from the condensation polymerization-imidization procedures of at least one biphenyl tetracarboxylic acid or its functional derivative with 2,5-diaminobenzoic acid, 1,4-diaminobenzoic acid, 3,5-diaminobenzoic acid or 1,3-diaminobenzoic acid, preferably, 3,5-diaminobenzoic acid.

The recurring units (B) of the formula (II) are preferably of the formula:

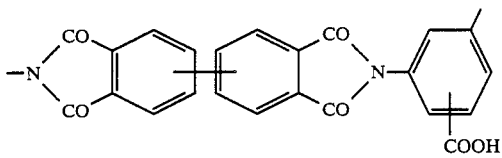

The recurring units (C) of the formula (III) can be derived from the condensation polymerization-imidization procedures of at least one biphenyl tetracarboxylic acid or its functional derivative with at least one member selected from the aromatic diamino compounds selected from those of the formulae (VI) and (VII):

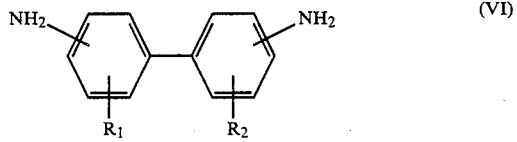

wherein $R^1$ and $R^2$ are as defined hereinabove, and

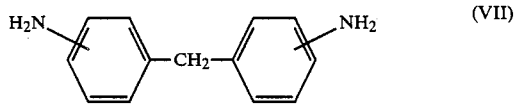

The diamimo biphenyl compound of the formula (VI) can be selected from o-anisidine (DAN) and o-tolidine (TOD).

In formula (VI), $R^1$ and $R^2$ may represent, independently from each other, a member selected from a hydrogen atom, methoxy, ethoxy, methyl, ethyl, and propyl radicals which are directly attached to the benzene nucleus.

The diaminodiphenylmethane of the formula (VII) can be selected from 4,4'-diaminodiphenylmethane (4,4'-DADM) and 3,3'-diaminodiphenylmethane (3,3'-DADM).

The aromatic imide polymer usable for the present invention can be prepared by the condensation polymerization-imidization procedures of an aromatic tetracarboxylic acid component containing at least 94 molar % of at least one member selected from 3,3',4,4'-biphenyltetracarboxylic acid, 2,3,3',4'-biphenyltetracrrboxylic acid, and functional derivatives thereof with an aromatic diamine component containing 20 to 85 molar % of 4,4'-diaminodiphenylether, 10 to 35 molar % of 2,5-diaminobenzoic acid, and 5 to 55 molar % of at least one aromatic diamine compound selected from those of formulae (VI) and (VII). The acid component and the diamine component are used in approximately equivalent molar amounts The acid and diamine components are reacted with each other in a polar solvent, for example, phenolic solvent, at a temperature of from 120° C. to 400° C., preferably, from 150° C. to 300° C., in a one step polymerization-imidization procedure.

When the above-mentioned reactions are carried out in the phenolic solvent, the resultant solution of the aromatic imide copolymer in the phenolic solvent can be used as a spinning dope solution Therefore, the above-mentioned method for the preparation of the aromatic imide copolymer is most preferable for the process of the present invention.

In another process for producing the aromatic imide copolymer, approximately equivalent molar amounts of the aromatic tetracarboxylic acid component and the aromatic diamine component are dissolved together in an organic polar solvent consisting of at least one compound selected from N-methylpyrrolidone, pyridine, N,N-dimethylacetamide, N,N-dimethylformamide, N,N-dimethylsulfoxide, tetramethyl urea, phenol, and cresol. The resultant reaction solution is subjected to a condensation polymerization procedure at a temperature of 80° C. or less, preferably from 0° C. to 60° C., to provide a polyamic acid having a logarithmic viscosity of 0.3 or more, preferably from 0.5 to 7, determined at a concentration of 0.5 g per 100 ml of N-methylpyrrolidone at a temperature of 30° C. The solution of the resultant polyamic acid in the organic polar solvent is mixed with an imidization promoting agent consisting of at least one member selected from tertiary amine compounds, for example, trimethylamine, triethylamine, and pyridine; acetic anhydride; thionyl chloride; and carbodiimide, and the mixture is subjected to an imidization procedure at a temperature of from 5° C. to 150° C. Otherwise, the polyamic acid solution, which is free from the imidization promoting agent, is directly subjected to an imidization procedure at a temperature of from 100° C. to 400° C., preferably from 120° C. to 300° C.

The resultant aromatic imide polymer can be precipitated from the polar solvent and be recovered in the form of fine powder.

In any imidization process, it is preferable that the resultant aromatic imide copolymer have a degree of imidization of 90% or more, more preferably 95% or more.

The term "degree of imidization" used herein refers to a proportion in percent of the real amount of imide bonds existing in a polymeric chain of an aromatic imide copolymer to the theoretical amount of the imide radicals that are theoretically possible to exist in the polymeric chain. The amount of the imide radicals can be determined by means of an infrared absorption spectrum analysis. That is, the amount of the imide bonds is determined from the height of the absorption peaks at 1780 cm$^{-1}$ and 1720 cm$^{-1}$.

If the degree of imidization of the aromatic imide copolymer to be used for the present invention is less than 90%, the resultant filaments sometimes may exhibit unsatisfactory mechanical strength and heat-resistance.

In still another process for preparing the aromatic imide copolymer, the organic polar solvent solution of the polyamic acid produced by the above-mentioned process and having a logarithmic viscosity of approximately 0.5 more is mixed with a large amount of acetone and/or ethyl alcohol to allow the polyamic acid to precipitate or is subjected to an evaporation procedure of the polar solvent in the solution. The resultant polyamic acid is recovered in the form of a fine white powder by means of filtration. Then the polyamic acid is heated at a high temperature of 150° C. to 400° C. to reach a degree of imidization of, preferably, 90% or more.

The tetracarboxylic acid component comprise,, as a principal ingredient, at least one member selected from 3,3',4,4'-biphenyl tetracarboxylic acid 2,3,3'4'-biphenyl tetracarboxylic acid, and functional derivatives thereof, for example, anhydrides, salts, and esters, preferably, anhydrides, thereof, more preferably 3,3',4,4'-biphenyltetracarboxylic dianhydride (s-BPDA).

The tetracarboxylic acid component may contain, as an additional minor ingredient, 10% or less, preferably 5% or less, based on the entire molar amount of the aromatic tetracarboxylic acid component, of at least one aromatic and aliphatic tetracarboxylic acid compound selected from, for instance, pyromellitic acid, 3,3′,4,4′-benzophenone tetracarboxylic acid, 2,3,3′,4′-benzophenone tetracarboxylic acid, 2,2-bis (3,4-dicarboxyphenyl) propane, bis (3,4-dicarboxyphenyl) sulfone, bis (3,4-dicarboxyphenyl) ether, bis (3,4-dicarboxyphenyl) thioether, butane tetracarboxylic acid, and anhydrides, salts, and ester derivatives thereof.

In the preparation of the spinning dope solution, the aromatic imide copolymer is dissolved preferably in a concentration of from 10% to 25% by weight, more preferably, from 12 to 20% by weight, in the solvent.

If the concentration of the aromatic imide copolymer is less than 10% by weight, the resultant hollow filaments sometimes may be uneven in form thereof and may exhibit an undesirably decreased hydrogen-carbon monoxide gas separating property ($P_{H2}/P_{CO}$). Also, if the concentration is more than 25% by weight, the resultant hollow filament sometimes may exhibit an undesirably reduced hydrogen gas permeating rate ($P_{H2}$).

The solvent usable for the solution preparation step comprises, as a principal component, at least one phenolic compound. It is preferable that the solvent consist of a phenolic compound alone. The solvent may contain, in addition to the phenolic compound, at least one additional solvent compatible with the phenolic compound which is selected from the group consisting of carbon disulfide, dichloromethane, trichloromethane, nitrobenzene, and o-dichlorobenzene, in an amount of 40% by volume or less, preferably, 20% by volume or less, more preferably, 10% by volume or less.

It is preferable that the phenolic compound usable for the process of the present invention have a melting point of about 100° C. or less, more preferably, 80° C. or less, and a boiling point under atmospheric pressure of about 300° C. or less, more preferably, 280° C. or less. Examples of the preferred phenolic compounds are monohydric phenols, such as phenol, o-, m-, and p-cresols, 3,5-xylenol, carvacrol, and thymol, and halogenated monohydric phenols in which a hydrogen atom in the benzene nucleus of the phenol is replaced with a halogen.

The most preferable halogenated phenols for the process of the present invention are those having a melting point of about 100° C. or less and a boiling point under ambient atmospheric pressure of about 300° C. or less, and which are represented by the formula (VIII):

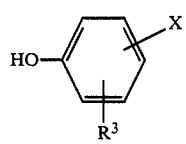

(VIII)

wherein $R^3$ represents a member selected from the group consisting of hydrogen atoms and alkyl radicals having 1 to 3 carbon atoms and X represents a halogen atom. In formula (VIII), it is preferable that the substituent X is located in the p- or m-position to the hydroxyl group. These halogenated phenols have a high ability to dissolve the aromatic polyimide of the biphenyltetracarboxylic acid type.

The halogenated phenols usable for the process of the present invention include 3-chlorophenol, 4-chlorophenol (p-chlorophenol), 3-bromophenol, 4-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene, and 4-bromo-2-hydroxytoluene.

Where aromatic imide copolymer is prepared by subject aromatic tetracarboxylic acid component and the aromatic diamine component to the single-step polymerization-imidization procedure in a phenolic compound in the state of a liquid or melt at a temperature of from 120° C. to 400° C., as described for the production of the aromatic polyimide, the resultant polymerization reaction mixture can be directly utilized as a spinning dope solution for the extruding operation. If necessary, the concentration of the imide copolymer or the viscosity of the reaction mixture is adjusted to a desired value before being subjected to the extruding operation.

On the other hand, where the aromatic imide copolymer is prepared as an isolated product in the form of a fine powder, the dope solution usable for the process of the present invention can be prepared by dispersing the imide copolymer powder in a solvent consisting mainly of the phenolic compound while stirring the mixture and heating the dispersion to a temperature high enough to prepare the dope solution.

In the extruding step in the process of the present invention, the spinning dope solution is extruded through a spinneret having at least one hollow filament spinning nozzle, preferably at a temperature of from 0° C. to 150° C., more preferably, from 20° C. to 120° C., to provide at least one hollow filamentary stream of the dope solution.

It is preferable that the spinning dope solution be a homogeneous solution and exhibit a rotation viscosity of at least 500 centipoises, more preferably, from 10 to 100,000 poises, at the above-mentioned spinning temperature.

In the extruding step, the spinning dope solution can be shaped into at least one hollow filament by any conventional hollow spinning method The formation of the hollow filament can be effected by using any type of spinning orifice for forming the hollow filament, for example, a tube-in-orifice type hollow nozzle or a segmented arc type hollow nozzle. A preferable spinning nozzle for the process of the present invention is of the tube-in-orifice type.

The tube-in-orifice type spinning nozzle usable for the present invention will be explained in detail hereinafter.

Usually the spinning dope solution is filtered and degassed at a temperature of from 20° C. to 200° C., preferably, from 30° C. to 150° C., and then supplied to the extruding step.

In the solidifying step in the process of the present invention, the extruded hollow stream of the spinning dope solution is introduced into a coagulating bath comprising at least one polar solvent which is compatible with the phenolic solvent in the spinning dope solution but substantially not capable of dissolving the aromatic imide copolymer, to solidify the hollow filamentary stream into hollow filament The extruded hollow stream of the spinning dope solution may be directly introduced into the coagulating bath. However, it is preferable that the spinning dope solution be extruded into the ambient air atmosphere and that the extruded hollow stream of the spinning dope solution be then introduced into the coagulating bath.

Preferably, the temperature of the coagulating bath is maintained constant at a relatively low level of, for instance, from −10° C. to 60° C.

The polar solvent to be contained in the coagulating bath should be compatible with the phenolic solvent in the spinning dope solution but substantially not capable of dissolving therein the aromatic imide copolymer, that is, it is preferable that the polar solvent in the coagulating bath be not capable of dissolving therein 1% by weight of the aromatic imide copolymer. The polar solvent may be selected from the group consisting of water; lower aliphatic alcohols having 1 to 5 carbon atoms, for example, methyl alcohol, ethyl alcohol, n-propyl alcohol and iso-propyl alcohol; lower aliphatic ketones having 3 to 5 carbon atoms, for example, acetone, methyl ethyl ketone, diethyl ketone, and methyl propyl ketone; tetrahydrofuran; dioxane; aliphatic ethers, such as ethyleneglycol monomethylether; aliphatic amides, such as dimethyl acetamide and dimethyl formamide; dimethylsulfoxide; diethylsulfoxide; lower alkylene glycols, for example, ethylene glycol and propylene glycol; lower aliphatic carboxylic acid having 1 to 4 carbon atoms, for example, formic acid, acetic acid, propionic acid, and butyric acid, and mixtures of at least one of the above-mentioned compounds with water, preferably, in a weight ratio of at least 3:7.

The coagulating liquid preferably contains at least 30% by weight of at least one aliphatic alcohol having 1 to 5 carbon atoms. Also, it is preferable that the coagulating liquid consist essentially of 40% to 90% by volume, more preferably, from 45% to 80% by volume, of at least one aliphatic alcohol having 1 to 5 carbon atoms with the balance of water.

Just after the spinning dope solution is extruded through the spinning nozzle, the non-coagulated hollow filamentary stream of the dope solution is preferably stretched, under tension, to a small extent. Also, it is preferable that the hollow filamentary stream be introduced into the coagulating liquid under tension, so as to be slightly stretched.

After the hollow filament stream of the dope solution is coagulated to an extent such that the hollow filament is not easily formed, the coagulated hollow filament is optionally brought into contact with a desired guide roll or stretching roll, and is finally wound on a bobbin or roll.

The coagulating procedure may be carried out in a single step or in two or more steps.

Usually, it is preferable that a hollow filamentary stream of the dope solution be coagulated in a first coagulating bath and be further immersed one or more times in an additional coagulation bath.

The two or more step coagulating procedure is effective for completely eliminating the phenolic solvent remaining in the body of the coagulated hollow filament, especially from the inside peripheral surface of the hollow in the hollow filament Thereafter, the coagulated hollow filament is washed with an inert washing medium, for example, water, and is stored in an inert medium, for example, water, if necessary. Otherwise, the washed hollow filament is dried in an adequate manner and the dried hollow filament is stored.

Figure 2:
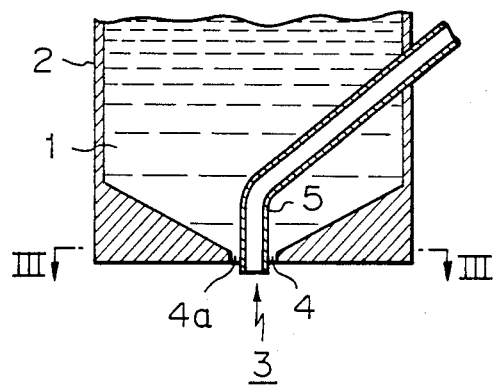
FIG. 2 is an explanatory, partially cross-sectional side view of a spinning nozzle for forming a hollow filamentary stream of spinning dope solution.
Figure 3:
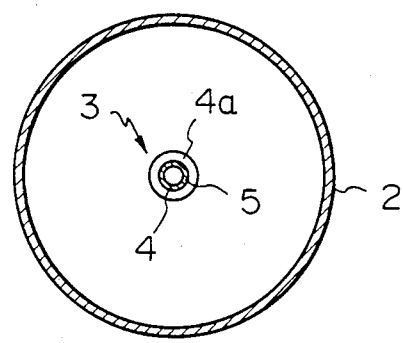
FIG. 3 is a bottom view of the spinning nozzle indicated in FIG. 2, along line III-III.

The hollow spinning procedures including the extruding step and the solidifying step can be carried out, for example, by using an apparatus as shown in FIGS. 1, 2, and 3.

Referring to these drawings, a spinning dope solution 1, which has been filtered and degassed at a temperature of from 20° C. to 200° C., is supplied into a spinning head 2 having a spinneret 3. The temperature of the spinning dope solution 1 in the spinning head 2 is maintained at a predetermined level of, for instance, from 20° C. to 150° C. When the spinneret 3 is of a tube-in-orifice type, as indicated in FIGS. 2 and 3, a hole 4 is formed in the bottom of the spinning head 2. The diameter of the hole 4 is variable, depending on the desired denier of the hollow filament to be produced. Usually, the inside diameter of the hole 4 is in the range of from 0.2 to 2 mm. Into the hole 4, a tube 5 is concentrically inserted, in the manner indicated in FIGS. 1, 2, and 3, to form an annular spinning nozzle 4a around the tube 5. The size of the tube 5 depends on the size of the hole 4 and the desired width of the annular slit 4a. Usually, the lower end of the tube 5 has an outside diameter of from 0.15 to 1.6 mm and an inside diameter of from 0.05 to 1.4 mm.

The spinning dope solution 1 is extruded through the annular slit 4a at the predetermined spinning temperature, while a back pressure usually of from 0.1 to 20 kg/cm$^2$, preferably from 0.2 to 10 kg/cm$^2$, is applied to the spinning dope solution 1 in the spinning head 2 by blowing an inert gas or liquid, for example, nitrogen gas, into the spinning head 2 through a conduit line 6, while a stream of a gas or liquid, for example, hot water, flows through the tube 5. The stream of the inert gas blown into the filamentary stream of the extruded dope solution forms a hollow-therein. The resultant hollow filamentary stream 7 of the spinning dope solution is introduced under tension into a first coagulating liquid 8 contained in a first coagulating vessel 9 while the hollow filamentary stream 7 of the spinning dope solution 1 is stretched at a predetermined extent.

The resultant first coagulated hollow filament 10 is withdrawn from the first coagulating vessel 9 through guide rolls 11 and then introduced into a second coagulating liquid contained in a second coagulating vessel 14, and recycled one or more times along the path passing through the guide rolls 15, 16, and 17 in the manner indicated in FIG. 1. In the second coagulating vessel 14, the coagulation of the hollow filaments is substantially completed. The resultant second coagulated hollow filament 18 is wound on a winding roll 21 while in contact with an inert liquid 22 contained in a vessel 23. Otherwise, the second coagulated hollow filament 18 may be introduced into an inert medium contained in a storing tank (not shown in the drawings) and stored therein All or some of the guide rolls 11, 12, 15, and 17, and winding roll 21, may be driven separately from each other by a driving motor (not shown in the drawings), each at a predetermined speed, so as to stretch the hollow filaments to a predetermined extent. Usually, the second coagulated hollow filament is delivered from the second coagulating vessel 14 at a speed of from 1 to 100 m/min, preferably, from 2 to 80 m/min.

The aromatic imide polymer hollow filaments produced in accordance with the process of the present invention exhibit an excellent gas separating property in addition to high mechanical strength and excellent resistances to heat and chemicals. That is, the aromatic imide polymer hollow filaments exhibit a high ratio $P_{H_2}/P_{CO}$, which corresponds to the selective gas permeability of hydrogen gas to carbon monoxide gas, of about 40 or more, particularly, from 50 to 100, and a hydrogen gas permeating rate ($P_{H2}$) of about $3 \times 10^{-5}$ cm$^3$/cm$^2$.sec.cmHg Therefore, the aromatic imide polymer hollow filaments are useful as gas separating material.

Examples of the present invention and comparative examples will be described hereunder.

EXAMPLES 1 TO 10 AND COMPARATIVE EXAMPLES 1 AND 2

(Preparation of Spinning Dope Solutions 1 to 10 and Comparative Dope Solutions 1 and 2).

In each of Examples 1 to 10 and Comparative Examples 1 and 2, a mixture of 80 millimoles of 3,3′,4,4′-biphenyl tetracarboxylic dianhydride (s-BPDA), 80 millimoles of the aromatic diamine, compounds as indicated in Table 1, and p-chlorophenol in an amount as mentioned hereinafter was placed in a separable flask with a stirrer and a conduit for introducing nitrogen gas thereinto. The mixture was subjected to a polymerization-imidization reaction procedure by elevating the temperature of the mixture to 180° C. over one hour and by maintaining it at the level as indicated in Table 1 for the time indicated in Table 1, while passing nitrogen gas through the flask, to prepare an aromatic imide copolymer.

In each of examples 1 to 9 and comparative examples 1 and 2, the p-chlorophenol was used in an amount necessary to cause the concentration of the resultant copolymer in the resultant polymerization mixture to be 15% by weight.

In Example 10, the amount of p-chlorophenol used was adequate for adjusting the concentration of the resultant copolymer in the resultant polymerization mixture to 17% by weight.

In each of Examples 1 to 10 and Comparative Examples 1 and 2 s-BPDA was used a molar amount slightly smaller than the entire molar amount of the aromatic diamine compounds used to control the molecular weight of the aromatic imide copolymer.

Table 1 shows a degree of imidization and logarithmic viscosity of each of the resultant aromatic imide copolymer and a rotation viscosity of each of the resultant polymerization solutions.

TABLE 1

| Example No. | Aromatic diamine component Type | Molar % | Polymerization-imidization time (hr) | Resultant polymer degree of imidization (%) | Logarithmic viscosity | Rotation viscosity of resultant polymerization solution (poise) at 100° C. | Resultant dope solution No. |
|---|---|---|---|---|---|---|---|
| 1 | DADE | 30 | 6.0 | >90 | 1.3 | 1600 | 1 |
|   | DABA | 20 |   |   |   |   |   |
|   | DAN  | 50 |   |   |   |   |   |
| 2 | DADE | 40 | 5.5 | >90 | 1.3 | 1500 | 2 |
|   | DABA | 20 |   |   |   |   |   |
|   | DAN  | 40 |   |   |   |   |   |
| 3 | DADE | 60 | 7.0 | >90 | 1.4 | 1800 | 3 |
|   | DABA | 20 |   |   |   |   |   |
|   | DAN  | 20 |   |   |   |   |   |
| 4 | DADE | 40 | 8.0 | >90 | 1.4 | 1600 | 4 |
|   | DABA | 30 |   |   |   |   |   |
|   | DAN  | 30 |   |   |   |   |   |
| 5 | DADE | 60 | 8.5 | >90 | 1.4 | 1700 | 5 |
|   | DABA | 30 |   |   |   |   |   |
|   | DADM | 10 |   |   |   |   |   |
| 6 | DADE | 50 | 10.0 | >90 | 1.5 | 2000 | 6 |
|   | DABA | 30 |   |   |   |   |   |
|   | DADM | 20 |   |   |   |   |   |
| 7 | DADE | 50 | 15.0 | >90 | 1.5 | 2000 | 7 |
|   | DABA | 30 |   |   |   |   |   |
|   | DADM | 10 |   |   |   |   |   |
|   | DAN  | 10 |   |   |   |   |   |
| 8 | DADE | 40 | 10.0 | >90 | 1.4 | 1800 | 8 |
|   | DABA | 30 |   |   |   |   |   |
|   | DADM | 10 |   |   |   |   |   |
|   | DAN  | 20 |   |   |   |   |   |
| 9 | DADE | 30 | 19.0 | >90 | 1.7 | 3200 | 9 |
|   | DABA | 30 |   |   |   |   |   |
|   | DADM | 10 |   |   |   |   |   |
|   | DAN  | 30 |   |   |   |   |   |
| 10 | DADE | 60 | 9.0 | >90 | 1.2 | 2500 | 10 |
|   | DABA | 30 |   |   |   |   |   |
|   | DADM | 10 |   |   |   |   |   |
| Comparative Example 1 | DADE | 50 | 16.0 | >90 | 1.4 | 1700 | Comparative dope solution 1 |
|   | DABA | 30 |   |   |   |   |   |
|   | PPD  | 20 |   |   |   |   |   |
| Comparative Example 2 | DADE | 80 | 6.0 | >90 | 1.5 | 2000 | Comparative dope solution 2 |
|   | DABA | 20 |   |   |   |   |   |

TABLE 1-continued

| Example No. | Aromatic diamine component | | Polymerization-imidization time (hr) | Resultant polymer | | Rotation viscosity of resultant polymerization solution (poise) at 100° C.) | Resultant dope solution No. |
|---|---|---|---|---|---|---|---|
| | Type | Molar % | | degree of imidization (%) | Logarithmic viscosity | | |
| 2 | | | | | | | |

Note:
DADE — 4,4'-diaminodiphenylether
DABA — 3,5-diaminobenzoic acid
DAN — o-diamisidine
DADM — 4,4'-diaminodiphenylmethane
PPD — p-phenylenediamine

EXAMPLES 11 TO 20 AND COMPARATIVE EXAMPLES 3 AND 4

(Preparation of Hollow Filaments)

In each of Examples 11 to 20 and Comparative Examples 3 and 4, the spinning dope solution as indicated in Table 2 was subjected to a spinning procedure by using the spinning apparatus as shown in FIGS. 1 to 3.

Referring to FIGS. 1, 2, and 3, the spinning dope solution 1 was fed into the spinning head 2. The hollow spinneret 3 of a tube-in-orifice type and had a circular hole 4 having a diameter of 1.0 mm and a tube 5 inserted concentrically into the hole 4. The lower end of the tube 5 had an outside diameter of 0.6 mm and an inside diameter of 0.3 mm. The resultant annular spinning nozzle 4a had an outside diameter of 1.0 mm, an inside diameter of 0.6 mm, and a width of 0.2 mm.

A back pressure of 2 to 5 kg/cm$^2$ was applied to the dope solution 1 in the spinning head by blowing nitrogen gas into spinning head 2 through the conduit 6 so as to extrude the dope solution 1 through the annular spinning nozzle 4a at a temperature of about 70° C. and to form a hollow filamentary stream of the dope solution, while a core gas consisting of nitrogen flowed into the hollow space of the resultant hollow filamentary stream 7 through the tube 5.

The hollow filamentary stream 7 of the solution was introduced into a first coagulating liquid 8 which consisted of a solution of 60% by volume of alcohol in water and was contained at a depth of 14 cm in a first coagulating vessel 9, at a temperature of approximately 0° C.

The first coagulated hollow filament 10 was removed from the first coagulating vessel 9 through guide rolls 11 and 12, and then introduced into the second coagulating liquid 13, which consisted of a solution of 60% by volume of methyl alcohol in water, and was contained in a second coagulating vessel 14. In the second vessel 14, the hollow filament 10 was recycled 8 times along the path passing through guide rolls 15, 16, and 17, in the manner indicated in FIG. 1. The distance between the centers of the guide rolls 15 and 17 was 80 cm.

The second coagulated hollow filament 18 was wound on a winding roll 21 and immersed in ethyl alcohol at a temperature of 50° C. and then in n-hexane at a temperature of about 50° C., to eliminate the remaining phenolic solvent. The hollow filament was dried at a temperature of 20° C. and then heat treated at a temperature of about 200° C. for one hour.

The resultant hollow filament had a circular annular cross-sectional profile having an outside diameter of 280 microns, and an annular body width of 70 microns.

Also, the resultant hollow filament was subjected to a determination of the gas permeating properties thereof, in the following manner.

A gas permeating module was made by bonding a bundle composed of a plurality of the hollow filaments to a glass tube with an epoxy resin bonding agent.

The module was subjected to measurements of gas permeating rates of hydrogen gas and carbon monoxide gas under a gauge pressure of 2 kg/cm$^2$G at room temperature.

From the measurement results, the hydrogen gas permeating rate ($P_{H2}$) *and hydrogen/carbon monoxide gas selective permeability*) ($P_{H2}$/P CO) were calculated. The results are shown in Table 2.

TABLE 2

| Example No. | | Spinning dope solution No. | Gas permeating property | |
|---|---|---|---|---|
| | | | $P_{H2}$ ($\times 10^{-5}$ cm$^3$/cm$^2$ · sec · cmHg) | $P_{H2}/P_{CO}$ |
| Example | 11 | 1 | 5.7 | 97 |
| | 12 | 2 | 6.1 | 85 |
| | 13 | 3 | 3.1 | 89 |
| | 14 | 4 | 5.9 | 73 |
| | 15 | 5 | 6.7 | 64 |
| | 16 | 6 | 6.4 | 40 |
| | 17 | 7 | 5.5 | 42 |
| | 18 | 8 | 6.5 | 79 |
| | 19 | 9 | 8.1 | 68 |
| | 20 | 10 | 8.2 | 99 |
| Comparative Example | 3 | Comparative dope solution 1 | <0.01 | — |
| | 4 | | 2 | 1.4 | — |

Table 2 shows that the aromatic imide copolymer hollow filaments of Examples 11 to 20 produced in accordance with the process of the present invention exhibit an excellent hydrogen gas permeating rate ($P_{H2}$) of more then 3.0$\times 10^{-5}$ cm$^3$/cm$^2$·sec·cmHg and a very large ratio $P_{H2}/P_{CO}$ of 40 or more and, therefore, are useful as a gas-separating material. However, the comparative hollow filaments of Comparative Examples 3 and 4 exhibited a poor hydrogen gas permeating rate and, therefore, are not useful as gas separating material.

We claim:

1. A gas-separating aromatic imide polymer hollow filament having a hydrogen gas permeating rate ($P_{H2}$) of $3 \times 10^{-5}$ cm$^3$/cm$^2$·sec·cmHg or more and a ratio ($P_{H2}/P_{CO}$) of hydrogen gas permeating rate ($P_{H2}$) to carbon monoxide gas permeating rate ($P_{CO}$) of 40 or more, comprising a multi-component aromatic imide copolymer comprising:

(A) 20 to 85 molar % of recurring units of the formula (I):

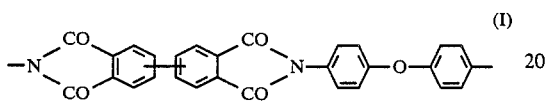

(B) 10 to 35 molar % of recurring units of the formula (II):

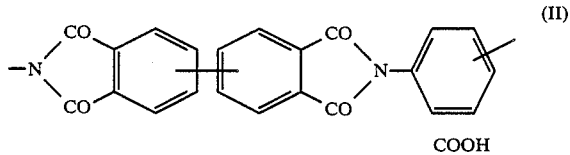

(C) 5 to 55 molar % of recurring units of the formula (III):

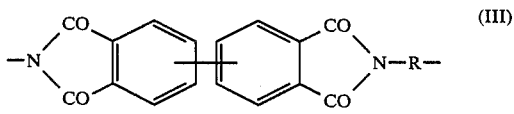

wherein R represents divalent radical selected from those of the formulae (IV) and (V):

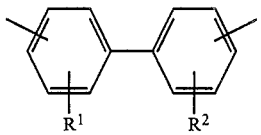

and

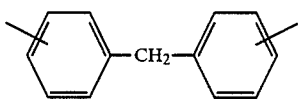

wherein $R^1$ and $R^2$ respectively represent, independently form each other, a member selected from the group consisting of a hydrogen atom, alkoxyl radicals having 1 to 3 carbon atoms and alkyl radicals having 1 to 3 carbon atoms.

2. The gas separating hollow filament as claimed in claim 1 wherein the aromatic imide copolymer has a degree of imidization of 90% or more.

3. The gas separating hollow filament as claimed in claim 1 wherein the aromatic imide copolymer has logarithmic viscosity of from 0.3 to 7.0, determined at a concentration of 0.5 g per 100 ml of a solvent consisting of mixture of 4 parts by volume of p-chlorophenol with 1 part by volume of o-chlorophenol at a temperature of 30° C.

4. The gas separating hollow filament as claimed in claim 1 wherein the divalent radical represented by R in the formula (III) is of the formula (V).

5. The gas separating hollow filament as claimed in claim 1 wherein the recurring units of the formula (II) are of the formula:

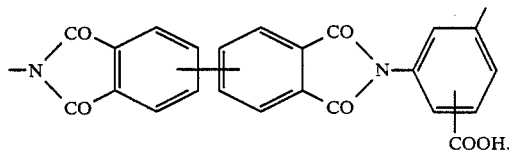

* * * * *